United States Patent

[11] 3,578,043

| [72] | Inventor | Donald C. Menge |
| | | Warren, Mich. |
| [21] | Appl. No. | 752,918 |
| [22] | Filed | Aug. 15, 1968 |
| [45] | Patented | May 11, 1971 |
| [73] | Assignee | Troy Steel Corporation |
| | | Troy, Mich. |

[54] LUMBER CUTTING APPARATUS
24 Claims, 9 Drawing Figs.

| [52] | U.S. Cl. | 143/6 |
| [51] | Int. Cl. | B27b 5/20 |
| [50] | Field of Search | 143/6, 6—46, 6—43, 46, 46—47, 47, 326; 83/(Inquired) |

[56] References Cited
UNITED STATES PATENTS

| 1,662,087 | 3/1928 | Thomas et al. | (143/46) |
| 2,546,277 | 3/1951 | Schwandt | 143/46 |
| 2,856,973 | 10/1958 | Hortan | 143/6 |

*Primary Examiner*—Donald R. Schran
*Attorney*—Hauke, Gifford and Patalidis

ABSTRACT: A rotatably adjustable pedestal support to which is mounted a circular saw for horizontal movement back and forth along a straight line across a piece of lumber and for rotation about a vertical axis to a desired cutting pitch. In a further embodiment a pair of rotatably adjustable pedestal supports are mounted on a longitudinal table slide for adjustment toward and away from each other between selected positions accommodating the finished length of a wooden stud or truss element.

PATENTED MAY 11 1971 3,578,043
SHEET 1 OF 4
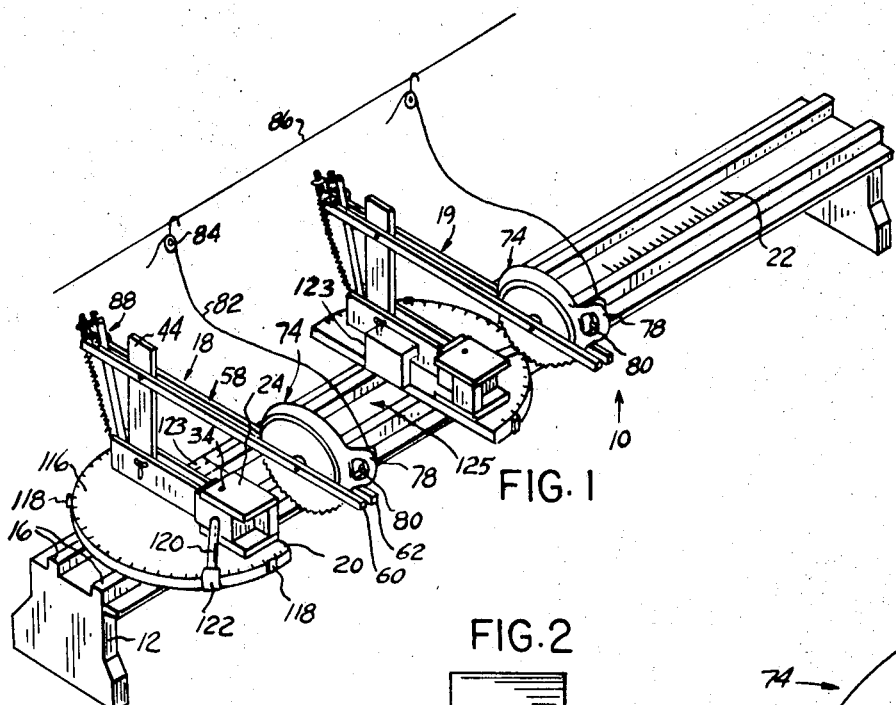
FIG. 1
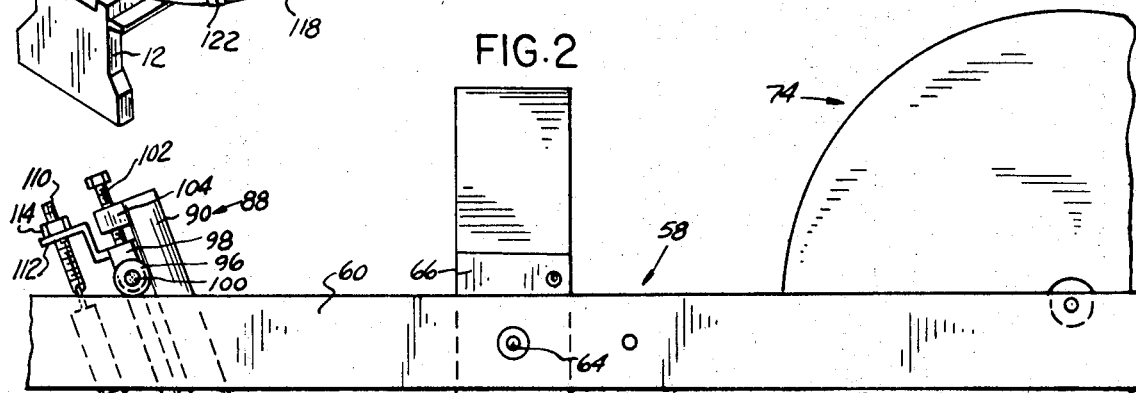
FIG. 2
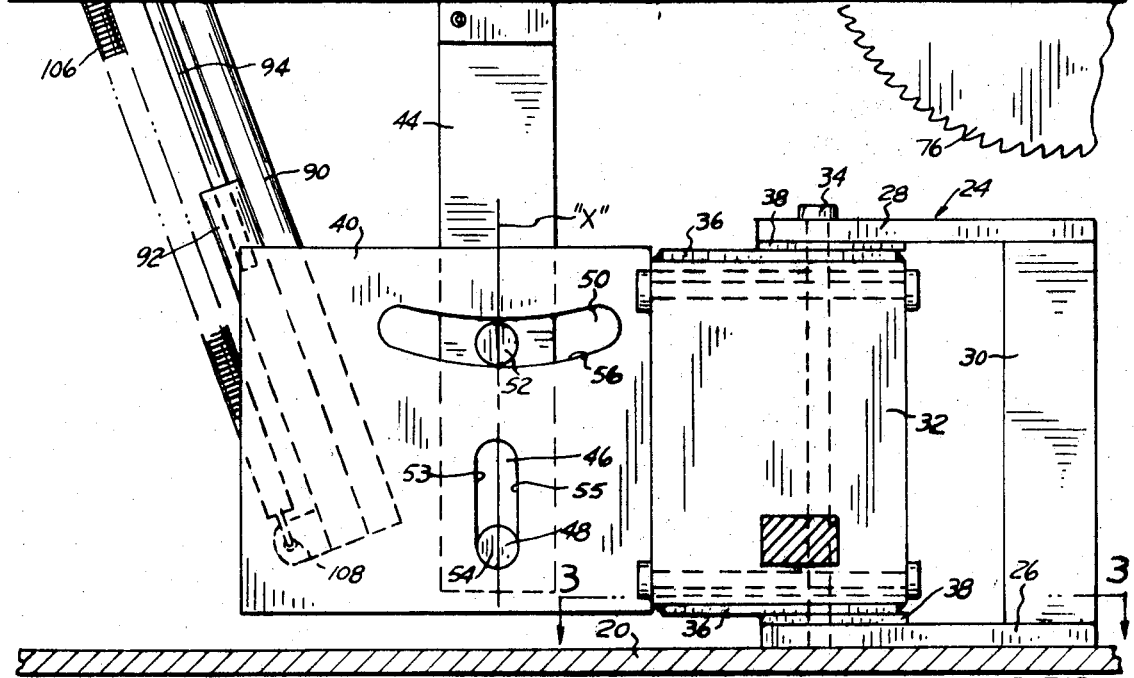
INVENTOR
DONALD C. MENGE

INVENTOR
DONALD C. MENGE

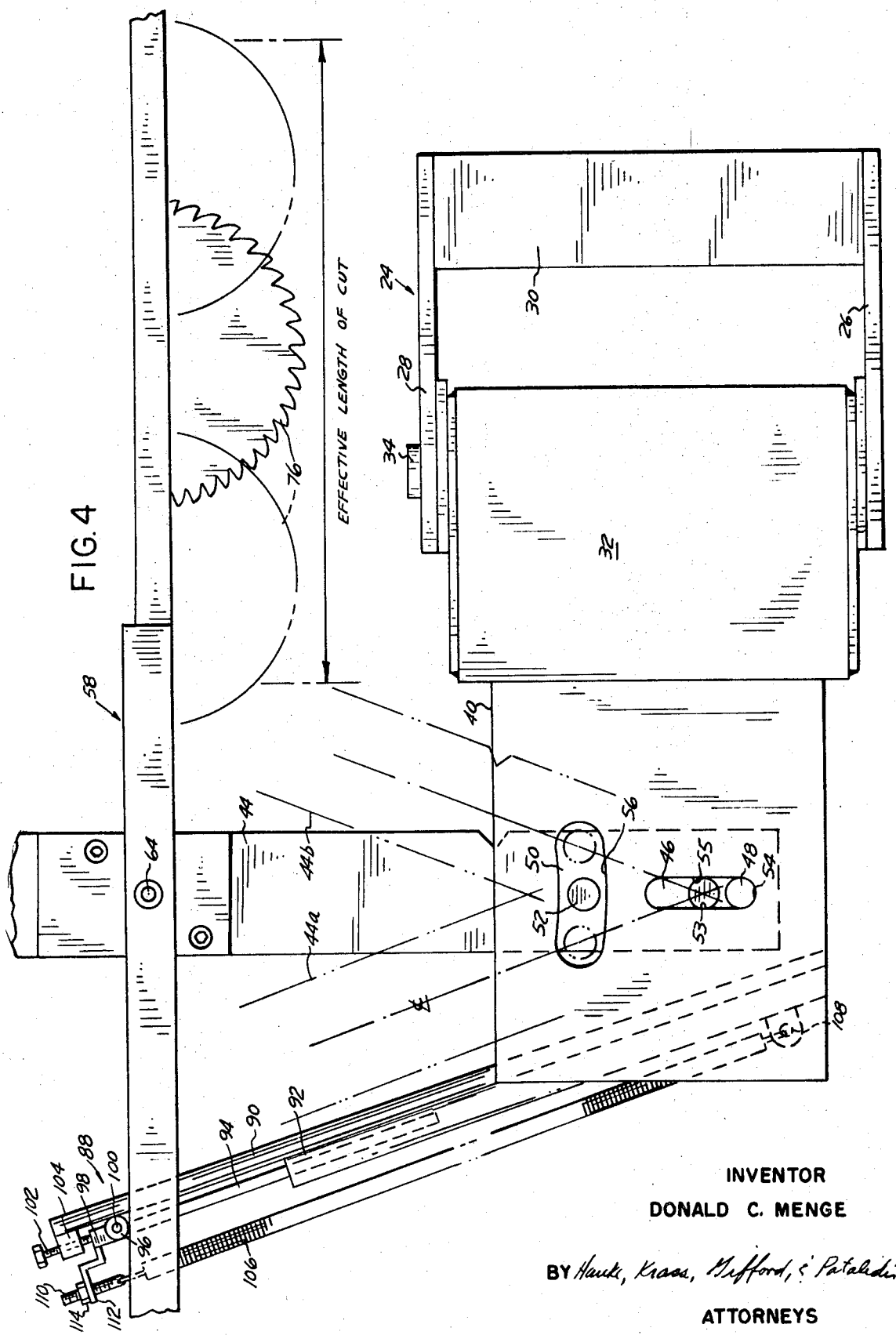

PATENTED MAY 11 1971 3,578,043

INVENTOR
DONALD C. MENGE

BY *Hauke, Krass, Gifford, & Patalidis*
ATTORNEYS

LUMBER CUTTING APPARATUS

CROSS-REFERENCE TO RELATED APPLICATIONS

This application is related in substance to my copending application Ser. No. 670,146 filed Sept. 25, 1967.

BACKGROUND OF THE INVENTION

1. Field of the Invention

The present invention relates to cutting apparatus to cut studs and/or shape the ends of an unfinished section of lumber for the purpose of obtaining a ready cut element for a prefabricated building truss.

2. Description of the Prior Art

In my above mentioned copending application, novel lumber cutting apparatuses are disclosed permitting an operator to cut unfinished lumber to shape for use as webs, diagonals, chords and other elements for prefabricated building trusses. Essentially, these apparatuses comprise an elongated frame having a slide way or track and a pair of carriages or movable pedestals mounted on the track for movement towards or away from each other. A supporting device either separate or attached to the pedestals provide means for positioning the unshaped lumber in a desired horizontal position above the track. Each carriage or pedestal mounts an angularly adjustable power driven saw. In my aforementioned copending application the saws are mounted for motion about a horizontal axis to permit lowering of the saw onto the lumber for the cutting operation.

Although the aforedescribed arrangement is sufficient to cut the ends of webs and diagonals at the proper angle for assembly into prefabricated building trusses, this arrangement is not suitable to cut the relatively long angles of top and bottom chords since the effective length of the cut in the prior arrangement is determined by the diameter of the saw blade only since the saw is stationary and does not travel in the direction of the cut. For this reason to obtain longer chord cuts two cuts at each end are necessary in the manner that the first cuts are made into the lumber which then has to be turned around end to end for the second finishing cut. This procedure requires additional time and manpower.

Conventional chord cutting machines are known in the art which cut long angular end faces for chord members but these—although fully automated—are relatively difficult to set up and downtime of these machines during a change over from one setup of particular angle cuts to another is excessive due to the difficult positioning of the multiple saw blades. Furthermore, these conventional machines are equipped to straighten warped lumber fed into the machine before cutting the angular end faces. However, when the cut lumber leaves the machine it assumes its original shape and thus the angular end cuts will be misaligned and do not match with the corresponding opposite interfaces in the truss assembly. In addition, these conventional machines are bulky and space consuming and need two or more operators to run the machine.

However, the main drawback in conventional machines or apparatuses of related prior art resides in the inability of making one-step long cuts when the saw is placed at an extremely acute or obtused angle in relation to the longitudinal centerline of the lumber since the length of the cut made by these prior machines is dependent on the radius of the saw blade. For instance, a 6 inch saw blade will cut a 2×2 piece of lumber at any desired angle between 90° and 180°, however, to cut a 2×4 piece of lumber with the same blade only a limited number of angular cuts right or left of the 90° cross cut can be made since, as will be obvious, the length of the cut increases with the acuteness or obtusity of the angle. Thus, a 2×6 piece of lumber using the same 6 inch blade in this example can only be cross cut, that is, at a 90° angle relative to the longitudinal centerline of the lumber and no angular cuts can be made with that size blade. It follows, that, in order to cut all three sizes of lumber at any desired angle a larger size saw blade has to be employed which would be uneconomical to use for the smaller size lumber. On the other hand, to employ the right size saw blade for each type of lumber a frequent change over will be necessary, required by the variety of angles necessary in truss members, thus causing excessive downtime and labor. Conversely, an uneconomical number of machines with diverse saw blade arrangements will have to be provided to meet the various requirements in cutting the angular ends of truss members.

Extremely long angular cuts can also be made in prior art machines in a two step procedure in case the blade is not large enough to accommodate the cut. This procedure provides to make an initial cut along the desired angle at one cutting station then reversing the lumber end by end and finishing the cut at the opposite cutting station in a two station saw set up as disclosed in copending application Ser. No. 670,146. This procedure, of course, requires also additional manpower and downtime of the machine during the lumber reversal.

By the provision of the present invention, novel means are provided to chop or cut any size lumber at any desired angle between 90° and 180° with the same size saw blade or to cut a number of smaller size lumber simultaneously at exactly the same angle.

SUMMARY

The primary feature of the present invention resides in the provision of a novel multiple station lumber cutting apparatus for simple chopping and/or cutting single or double end web members and heel ends for chords to be assembled into prefabricated trusses by the method and means described in U.S. Pat. No. 3,011,226.

The present novel multiple station cutting apparatus comprises in general, a longitudinal support table provided with slides supporting two or more substantially semicircular plates arranged for movement towards or away from each other. Intermediate the plates the support table carries one or more lumber support for arrangement of the lumber in a longitudinal direction between the plates. The plates carry pedestals which pivotally secure swingable saw carriages for rotation around the semicircular plates on adjustable vertical axes extending through said pedestals. Said saw carriages comprising arms pivoted for longitudinal rocking movement back and forth across said vertical pivot in selected angular positions transverse to the longitudinal support table. The arms carry circular power saws at one end and are retained and guided at its opposite ends by spring loaded adjustable roller means to keep the arms normally in a horizontal position relative to the vertical pivot axes. The saw arm arrangement is such that the arms may be raised manually to allow the insertion of the lumber. The saw arms are pivoted on rocking members in the form of uprights which are pivoted to the vertical pivot member for rocking movement in a fashion novel per se in such way as to assure a straight horizontal back and forth movement of the saw arms upon application of manual push or pulling force thereto during the lumber cutting operation. The vertical swing pivots further carry an index arm for travel around the semicircular plates which are provided with a scale indicating angular points around the arc of the semicircular plates for positioning of the saw carriages at any desired angular position depending on the required end cuts for any particular truss member. Oppositely adjustable stops are provided along the arc of the semicircular plates and these as well as the outer end of the index arms may be provided with magnets in order to lock the saw carriages in two selected angular positions for a series of identical angular end cuts. At each cutting station, longitudinal lumber stops are provided to align the lumber in longitudinal direction. Preferable, the end stops may be adjustable with rotation of the saw carriage for a purpose to be explained. The lumber supports intermediate the saw carriages carry adjustable clamps to clamp the lumber or a number thereof side by side prior to the start of the cutting operation. These clamps are of the quick release type to facilitate the removal and insertion of the lumber.

The power saws mounted on the arms of the saw carriages may be of the conventional circular hand saw type driven electrically and the electrical cables from the power saws may be mounted in overhead fashion on slidable pulleys for connection to the power outlet so as not to interfere with the operation of the apparatus and the free movement of the saw carriages.

The vertical axes around which the saw carriages swing are adjustable in relation to the longitudinal centerline of the lumber to be cut to allow relatively long angular cuts to be made as may be required in certain truss members, or to cut a number of truss members simultaneously in distinction over conventional truss cutting apparatuses which embody only stationary saw blades adjustable only in angular direction. The present invention provides novel means to allow for travel of the saw in the direction of the cut. By this arrangement, a number of identical truss members can be cut simultaneously or relatively long angular cuts may be made as required for the larger top or bottom chords for trusses. Previously, special machines had to be provided for this purpose.

Thus angularly adjustable end stops for the lumber assure that when a number of lumber is being cut simultaneously, each cut is being made at exactly the same location and angular direction so that identical end cuts will be turned out with one stroke of the power saw.

The present novel cutting apparatus is adaptable for cutting or chopping a variety of lumber for use in trusses at selected angles determined by the desired pitch of the particular truss member without regard to any warped condition of the lumber in condition to conventional machines which tend to straighten out warped lumber prior to the cut which is undesirable since the cuts will be misaligned after the lumber is released from the machine and assumes its original warped shape.

A chute secured to the saw carriages may be provided below each cutting area to provide an easy means for collecting the cutoff sections of lumber but permitting the lumber to fall of its own weight assisted by the draft created by the rotating saw blades.

Accordingly, the primary object of the present invention resides in the provision of a cutting apparatus for sawing an unfinished section of lumber into a precut truss element having its opposite ends cut at a predetermined pitch by providing a slide table having saw stations mounted thereon for relative movement towards and away from each other to positions accommodating the length of the finished truss element, each of the saw stations being rotatable about an adjustable vertical axis to selected positions corresponding to the desired pitch of the truss element, the saw stations being provided with means for horizontal travel of the saws mounted thereon in a direction of the desired cut to allow relatively long cuts being made.

Another object of the present invention is the provision of an improved truss element cutting apparatus for sawing an unfinished section of lumber into a precut truss element comprising means to accommodate several identical pieces of unfinished lumber for cutting into preshaped truss elements simultaneously at the same desired pitch.

A further object of the present invention resides in the provision of a cutting apparatus for truss elements comprising a mechanism by which the cutting means may be reciprocated in a straight horizontal line to accomplish a relatively long cutting stroke at any selected angle corresponding to the desired pitch of a prefabricated truss element.

Further objects and novel features of the present invention will become readily apparent to one skilled in the art by reference to the following detailed description in connection with the accompanying drawings, the scope of the invention being indicated by the appended claims.

BRIEF DESCRIPTION OF THE DRAWINGS

FIG. 1 is a perspective view of a preferred form of cutting apparatus embodying the present novel invention;

FIG. 2 is an enlarged side view of the main portion of the present novel saw travel mechanism;

FIG. 4 is a schematic view of the complete saw travel mechanism illustrating the extent and direction of travel of the saw;

DESCRIPTION OF THE PREFERRED EMBODIMENTS

Figure 3:
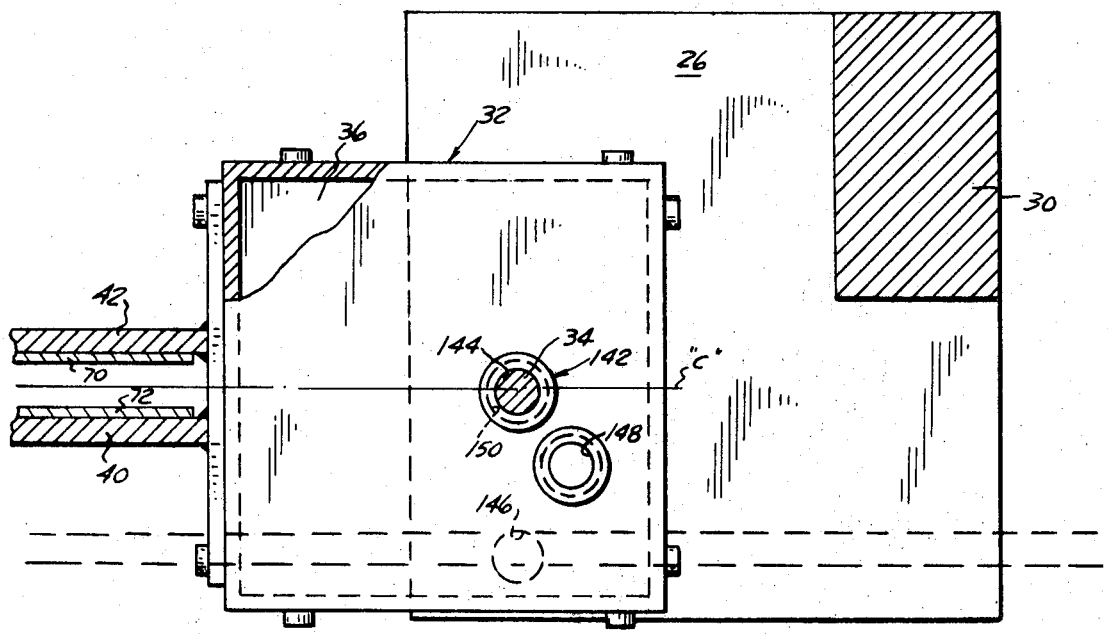
FIG. 3 is a cross section plan view of the vertical pivot arrangement embodied in the mechanism in FIG. 2 as seen substantially along line 3–3 thereof.

With reference to the drawings, FIG. 1 illustrates a preferred structure of cutting apparatus comprising an elongated worktable 10 which may be composed of base members 12 for support on the ground to which is secured a longitudinal platform 14 of the like having parallel rails 16. Supported on the rails 16 for sliding engagement therewith are a pair of saw carriages 18, 19 which are substantially identical except for oppositely reverse arrangement and for purpose of clarity only one will be described in detail it being understood that the opposite saw carriage is constructed in the same manner.

The saw carriage 18 is composed of a substantially semicircular plate 20 which underneath is provided with slides (not shown) engageable with the rails 16 on the worktable 10 to enable the plate 20 to be moved along the worktable to any desired location in relation to the opposite saw carriage 19. If desired, either one of the saw carriages 18 or 19 may be fixed on the platform 14 so that only one carriage has to be moved for length adjustment of the work area. To enable the operator in positioning the saw carriages 18 and 19 relative to each other as determined by the finished length of the workpiece a linear scale 22 may be provided on the table platform 14 for easy indication of the desired distance between the saw carriages 18 and 19 as necessitated by the finished length of the truss element.

Mounted on the semicircular plate 20 at the inner end thereof opposite its periphery 21 is a support 24 comprised of a bottom plate 26 welded or otherwise secured to plate 20 and a top plate 28 vertically spaced and supported by a standard 30 located towards one corner of both said plates 26, and 28. The plates 26, 28 and 30 may be bolted, welded or otherwise secured together to form an open sided box like structure.

The open end of the support 24 receives a pivot member 32 in the form of an enclosed square tube containing a removable pivot pin 34 which extends outwardly thereof at the top and bottom and into the top and bottom plates 26, 28 of the support 24 to be supported therein. Attached to the inwardly facing sides of the top and bottom support plates 26, 28 are spacers or wear plates 38 adapted to be in bearing contact with similar wear plates 38 secured respectively to the top and bottom of the square pivot tube 32. Suitable antifriction thrust bearings (not shown) may be provided within the square pivot tube 32 around the pivot pin 34 to facilitate rotation of the pivot tube 32 within the support 24.

Two identical parallel rectangular support plates 40 and 42 are attached in vertical position to one side of the square pivot tube 32 by welding or otherwise to extend therefrom. These support plates are positioned side by side but spaced a small distance from each other (see FIG. 3) in order to receive a rocker arm 44 retained between said plates for rocking movement by the following unique dual pivot arrange. The support plates 40 and 42 are provided in the lower portion with coaxial identical vertical slots 46. Coaxial trunnion pins 48 attached to both sides of the lower end of the rocker arm 44 for extension into the vertical slots 46. The upper portion of support plates 40 and 42 is provided with another pair of identical coaxial slots 50 spaced a distance above the vertical slots 46. Slots 50 are formed curvilinear and extend in a substantially horizontal direction in relation to the vertical slots 46. Another pair of coaxial trunnion pins 52 is attached to both sides of the rocker arm 44 above trunnion pins 48 on the same vertical centerline X. Trunnion pins 52 extend within the curvilinear slots 50 for camming engagement therein. Normally, in a neutral position of the rocker arm 44, that is, in a straight vertical position as shown in FIG. 2, the lower trunnion pins 48 rest upon the inner bottom surface 54 of the vertical slots 46 and the upper trunnion pins 52 rest on the lowest point along the lower surface 56 of the curvilinear slots 50 that is, midway between the ends of the slots 50. With further reference to FIG. 4 upon rocking movement of the rocker arm 44 back and forth both lower and upper trunnion pins 48 and 52 are displaced within their respective slots 46 and 50 thus forcing vertical displacement of the rocker arm 44 in addition to the lateral rocking movement due to their camming engagement with the inner surfaces of the slots. If for instance, the rocker arm 44 is rocked rearwardly or to the left in FIG. 4, to the position indicated at 44a, the upper trunnion pin 52 rides tp the left upwardly along the curvilinear bottom surface 56 thus likewise forcing the lower trunnion pin 48 to ride up in the vertical slot 46 along the inner left side 53 thereof. Conversely, if the rocker arm 44 is moved forwardly or to the right in FIG. 4 to the position indicated at 44b the upper trunnion pin 52 rides to the right upwardly along the curvilinear bottom surface 56 forcing the lower trunnion pin 48 to ride up in the vertical slot 46 along the inner right side 55 thereof. Thus, in either forward or rear rocking motion of the rocker arm 44 a slight relative rise is imparted thereto due to the unique trunnion pin and cam arrangement in such fashion that a point at any location on the upper end of the rocker arm would—during rocking motion of the rocker arm—describe a straight horizontal line in contrast to a conventional rocker arm construction having a fixed pivot. In these conventional arrangements a point on the rocker arm would—during rocking movement—describe a circle with the fixed pivot as its center. Such movement, however, would be highly undesirable in the present novel cutting apparatus as explained further on.

The exact dimension and location of the slots 46, 50 relative to each other as well as the curvature of the upper slot 50 to obtain the desired horizontal movement of a point located on the other end of the rocker arm is dependent on varying factors defying an equatic solution and for this reason will have to be determined by the trial and error method.

Pivoted to the upper end of the rocker arm 44 which extends upwardly from the support plates 40, 42, is a support beam 58 consisting mainly of two parallel rails 60 and 62 with the rocker arm 44 extending in between them and pivotally connected thereto by means of a pivot pin 64 at a location substantially midway between the ends of the support beam 58.

In order to reduce wear upon rocking movement of the rocker arm 44 wear plates 66 are attached to the rocker arm 44 between the opposite sides thereof and the insides of the support beam rails 60, 62. Similarly, further opposite wear plates 70 and 72 are preferably inserted between the sides of the rocker arm 44 and the opposed insides of the support plates 40, 42 as seen in FIG. 3. These may be preferably attached to the plates 40, 42.

The support beam 58 normally extends horizontally across the vertical pivot pin 34 intersecting the axis thereof and the forward end of the support beam 58 carries a conventional circular electric power saw 74 with its cutting blade 76 extending between the support beam rails 60, 62. The power saw 74 has a hand grip 78 providing a start and stop trigger 80 and an electrical connector cable 82 extends from the saw upwardly over a pulley 84 movably suspended from an overhead support line 86 so that the electrical connector cable will not interfere with the normal operation of the cutting apparatus but does not hinder free movement of the saw carriage.

The free end of the support beam 58 extends rearwardly from the rocker arm 44 to be normally retained in an accurate horizontal position normal to the vertical pivot axis by an adjustable roller and tension spring arrangement generally indicated at 88. The adjustable roller and tension spring arrangement 88 is composed of a back stop 90 in the form of a rod extending between the support beam rails 60, 62 in an angular direction rearwardly substantially corresponding to the maximum rearward movement of the rocker arm 44 as determined by the dimensions of the slots 46, 50. The lower end of the back stop 90 extends between the two support plates 40, 42 to be attached thereto by means of welding or the like. A section of a telescope tube 92 is attached to the lower part of the back stop 90 between the plates 40, 42 to telescopically receive a rod 94 which extends upwardly out of the telescope tube 92 in parallel direction to the backstop 90 and between the support beam rails 60, 62. The upper end of the telescoping rod 94 supports a roller 96 positioned in transverse direction to the support beam rails 60, 62 and in rolling engagement with the top surfaces thereof. A block 98 is attached to a shaft 100 of the roller 96 which is attached to a screw 102. The screw 102 extends rotatably through a screw support 104 attached to the upper end of the back stop 90 so that upon rotation of the screw 102 the vertical position of the roller 96 may be adjusted up or down to initially position the support beam 58 may be adjusted up or down to initially position the support beam 58 in a straight horizontal position by means of exerting a force upon the end of the support beam 58 upon downward movement of the roller 96 and upon upward movement of the roller 96 the end of the support beams will follow due to the gravity force of the power saw 74 on the other end of the beam 58. To provide sufficient tension on the roller 96 for bearing contact with the upper surface of the support beam 58 a tension spring 106 is provided whose lower end is attached to a bracket 108 secured to the lower end of the telescope tube 92. The upper end of the spring 106 is attached to the end of a screw rod 110 extending through a bracket 112 which is secured to the roller block 98 for movement therewith. The screw rod 110 receives a nut 114 for extension or retraction of the screw rod 110 to adjust the tension of the spring 106 in accordance with the position of the roller 96.

The semicircular plates 20 are provided with radial scales 116 in the form of indices spaced at convenient angular intervals to indicate the degree of angular position of the saw carriages 18, 19 in relation to the centerline of the longitudinal workpiece. Attached to the peripheries of the semicircular plates 20 are opposed adjustable stop means 118 adapted to provide a stop for the saw carriages in any particular angular position to either side of the longitudinal centerline of the workpiece by means of an indicator arm 120 attached to the pivot tube 32 extending across the semicircular plates 20. The indicator arm 120 has a head portion 122 extending beyond the periphery of the semicircular plates 20 adapted to abut the adjustable stops 118 at the desired angular position of the saw carriages 18, 19. To facilitate a series of identical angular cuts at the exact pitch location the insides of the adjustable stops 118 as well as the direct opposite sides of the indicator arm head 122 may be provided with magnets (not shown) to swing the saw carriages in the desired position and locking them during the duration of the cut.

Figure 5:
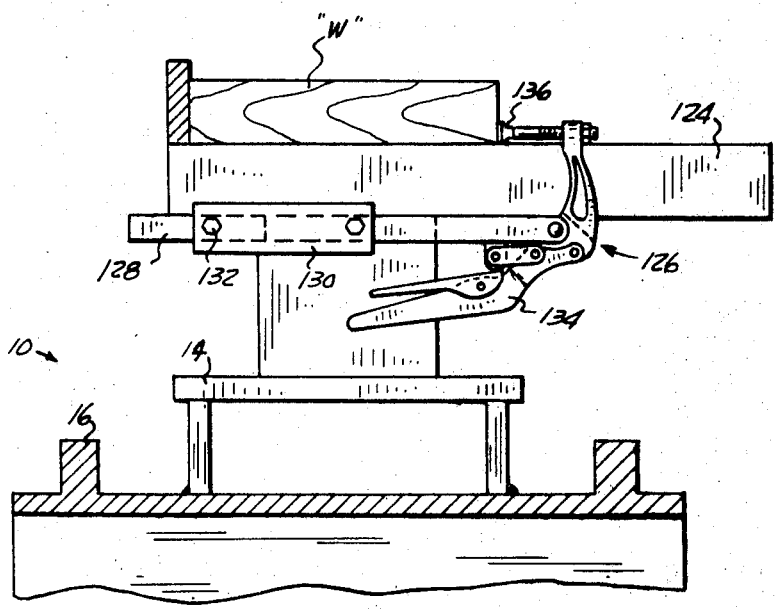
FIG. 5 is cross section through the worktable in FIG. 1 illustrating a lumber clamping mechanism.

Both carriages 18, 19 are provided with suitable supports 123 adjacent the saws 74 to support the ends of a longitudinal workpiece. The supports 123 are attached to the back side of the plate 20 by any suitable fastening means, such as by welding. With reference to FIG. 5 a central work piece support 124 is provided along the worktable 10 between the saw carriage 18, 19. For purposes of clarity, the central work piece support 124 is not illustrated in FIG. 1, however its approximate location on the worktable 10 is indicated by the arrow 125. The workpiece support 124 is provided with an adjustable clamp 126 which is attached to the end of a transversely movable rod 128 slidable within a support 130 which is attached to the worktable 10. The rod support 130 can be locked into place by means of a set screw 132 extending into the support 130. The clamp 126 is of the quick release swing type having a lock grip handle 134 to swing and lock the clamp in place after placing of the workpiece W on the support. Individual fine width adjustment to compensate for width irregularities of the workpieces can be made by adjustment of the clamp head 136. Thus the transversely adjustable clamp 126 accommodates workpieces of varying width dimensions or a number of workpieces placed side by side, as in FIG. 6, to be cut simultaneously at identical angles. In further reference to FIG. 6 end alignment stops 138 may be provided at either or both of the saw carriages and are attached to the saw carriages for rotation therewith by any suitable means (not shown). Thus, if a number of longitudinal workpieces W are intended to be cut simultaneously as indicated in FIG. 6 the end alignment stop 138 upon rotation of the saw carriage 18 (or 19) to the desired angular position as determined by the required pitch of the finished truss element causes the workpieces W which are placed side by side to assume a staggered position in relation to each other the degree of which depends on the angular position of the saw carriages in this manner, after the multiple workpieces have been securely clamped to the support 124 each piece will be cut at the exactly same angular position along the indicated line of cut by one working stroke of the power saw 14.

Figure 6:
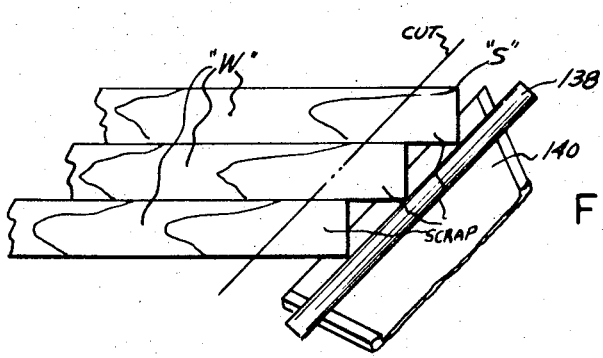
FIG. 6 is a perspective view of one saw carriage showing the chute arrangement and longitudinal lumber stop more in detail.

With continuing reference to FIG. 6, chutes 140 may be provided at each of the saw carriages 18, 19 adjacent the saw blades 76 and rotatable with the carriage to collect the sawed off sections S of the workpieces as they fall and direct them into suitable scrap containers (not shown) positioned underneath the chutes.

As stated previously in the introductory part of the specification the primary feature of the present novel cutting apparatus consists in the adaptability of adjusting the vertical saw pivots 34 to various selected positions around a normal dead center location so that the saws 74 will be places off center in relation to the longitudinal centerline of the workpiece or workpieces to obtain in connection with the horizontal travel of the saw relatively long angular cuts as may be required in certain top or bottom chord members for trusses or when cutting a multiple of workpieces simultaneously. With reference to FIG. 3, the repositioning of the pivot tube 32 to an offset location is accomplished in the following manner: normally the pivot pin 34 for the pivot tube 32 will be positioned in the dead center location 142 the axis of which intersects the longitudinal centerline C of the workpiece W. To place the saw off center for long angular cuts the pivot pin 34 is removed from the dead center location 142 and the pivot tube 32 together with the saw carriage which is attached thereto is moved in transverse direction to the centerline to align the pivot hole 144 in the pivot tube with another hole 146 in the bottom respectively top pivot support plates 26, 28 and securing pivot pin 34 in the new location. Conversely, upon removal of the pivot pin 34 the pivot tube 32 may be removed sideways and outwardly to align another set of pivot holes 148 in the pivot tube with the first pivot hole 150 in the support plates 26, 28. Additionally, the second pivot hole 148 may be brought in alignment with the other pivot hole 146 in the support plates 26, 28. Thus, three alternate offset pivot locations in addition to the dead center position are obtainable to enable relatively; long angular cuts to be made with one stroke of the power saw 74.

Figure 7:
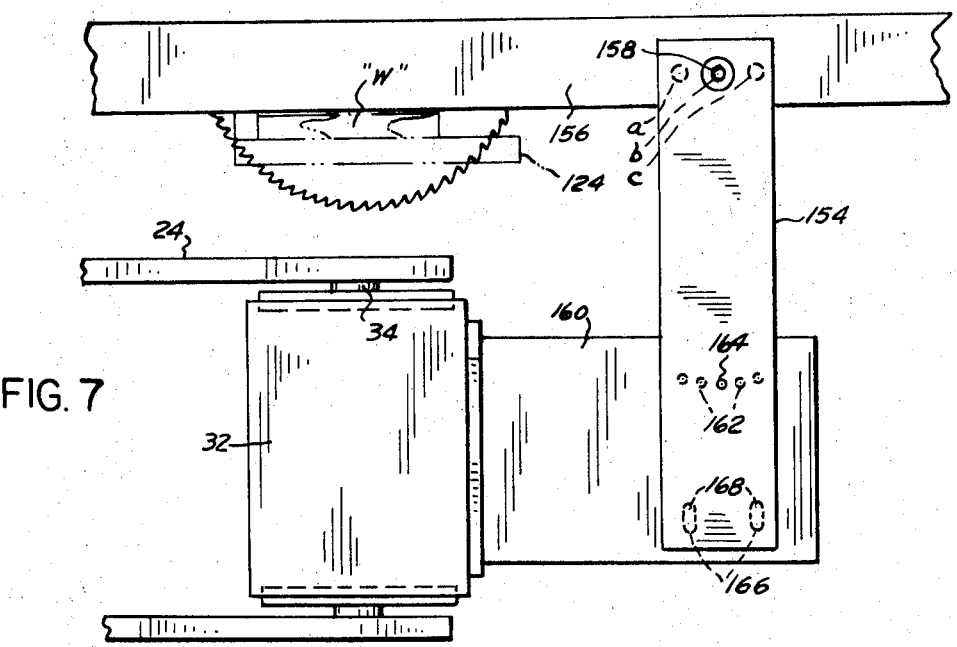
FIG. 7 is a side view of a further embodiment of the present novel lumber cutting mechanism.

FIG. 7 shows an alternate embodiment of a saw carriage 152 in which the mechanism for transverse horizontal travel of the saw has been omitted. In this instance, the rocker arm is replaced by a stationary post 154 which may be pivoted to a saw support beam 156 at a number of selected locations 158, a, b, or c, to allow the support beam to be manually swung upwardly for insertion or removal of the workpiece W and downwardly upon the workpiece for cutting. The post 154 is adjustably secured to an alternate vertical support plate 160 attached to the pivot tube 32 and can be adjusted in such fashion as to maintain the support beam pivot level at any of the selective locations. This is accomplished by a series of pin holes 162 arranged horizontally along an arc to allow repositioning of a securing pin 164. Further, a dual slot arrangement 166 is provided at the bottom of the post 154 which receives pins 168 for camming engagement therein allowing repositioning of the post 154 according to a selected pivot location 158, a, b, or c, on the support beam 156 without sacrificing the horizontal levity of the support beam. Although this alternate embodiment includes the same adjustable vertical pivot feature as described in connection with FIG. 3 for obtaining angular cuts, the length of the cuts will be limited by the diameter of the cutting blade 76 since no transverse travel of the saw is provided.

Figure 8:
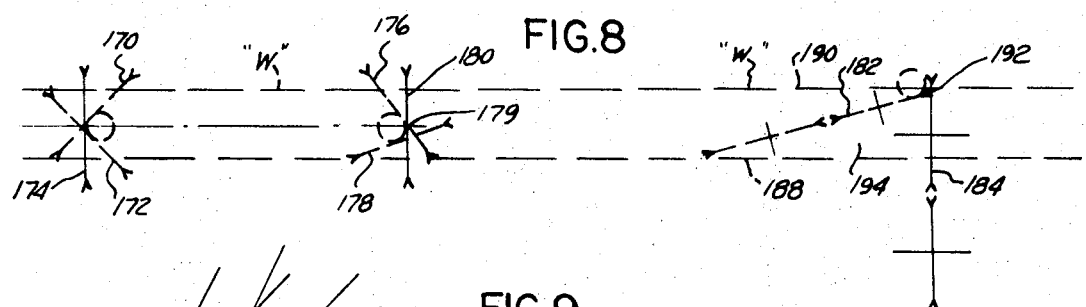
FIG. 8 is a schematic diagram of a lumber cutting operation at various angle and illustrating the diverse saw blade positions for each angular cut.
Figure 9:
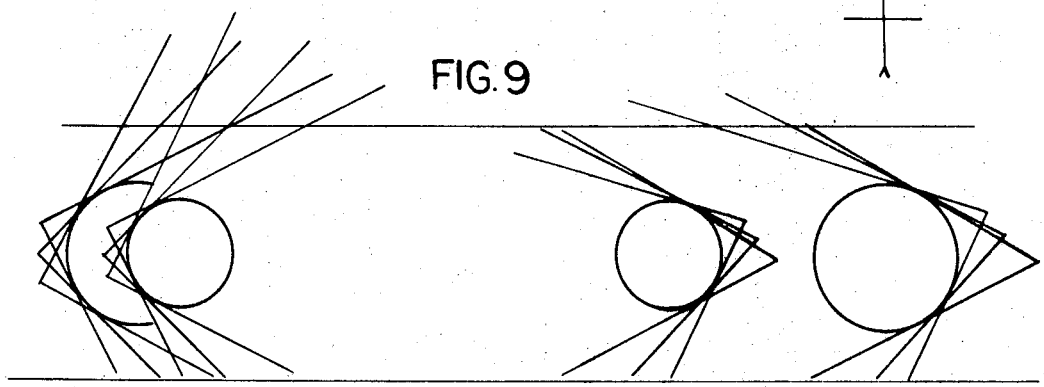
FIG. 9 is a diagrammatic view similar to FIG. 8 illustrating the setup for cutting diverse angles for truss members.

Referring now to FIGS. 8 and 9, these diagrams illustrate the layout and determination of cutting angular ends of truss members as may be accomplished with the present novel apparatus. In FIG. 8 at the extreme left a double cut is shown in which both angular cuts 170 and 172 are made at the same angle intersecting each other at the centerline C of the workpiece W. As can be seen by the indicated diameter of the saw blade these cuts can be made without travel of the saw. For instance, if the workpiece is a 2×4 piece of lumber and using a 6 or 7 inch blade these cuts may be made by simply springing the saw down on the lumber without transverse travel of the saw, however, using a steeper angle or wider workpiece a straight cut 174 may be made first in a direction normal to the centerline of the workpiece to thus considerably shorten the length of the angular cuts 170, 172 in order to use the same size of saw blade and without having to make two cuts along the same line. This is more clearly illustrated at the central diagram of FIG. 8 showing a double end cut at the other end of the workpiece these cuts being made at different angles. In this example, the cut 176 at a high angle in regard to the centerline of the workpiece may be made first and thereafter the cut 178 at a considerably lower angle point 180 and thus finishing the end-cut of the workpiece. It will be noted that the second angular cut although positioned at a much lower angle than the first is of relatively short length to be easily made with the same diameter saw blade and without travel of the saw. Conversely, if instead of a pointed tip a heel 179 is desired at the vertex of the angular cuts which is required in certain truss members a straight cut 180 normal to the centerline of the workpiece may be made first and thereafter the angular cuts 176, 178 in any desired succession. It will be noted that all these cuts can be made without changing the diameter of the blade or without travel of the saw.

Referring now to the diagram on the extreme right of FIG. 8, this illustrates the heel end cutting of a top chord truss member at an extremely long low angular cut. Obviously, the same diameter saw blade would not make this cut by merely bringing the blade down upon the workpiece. To enable this cut 182 being made which is about twice as long as the diameter of the saw blade the following procedure is necessary: the saw pivot 32 will have to be relocated to a position offset from the centerline C of the workpiece W to either side thereof depending along which side the angular cut 182 is to be made. After thus positioning the saw blade 76 a first straight cut 184 across the workpiece and normal to the centerline thereof is being made. Thereafter, the saw carriage is rotated to the desired angular position as determined by the required pitch of the truss member then the angular cut 182 is being made by moving the saw back and forth across the workpiece by means of the herein described travel mechanism, thus completing the long cut in one stroke with the same size saw blade. The finished cut 182 then intersects the edge 188 of the workpiece W at one end and the straight cut 184 at the other end a predetermined distance spaced from the opposite edge 190 of the workpiece to provide the desired heel portion and severing a piece of scrap 194 from the end of the workpiece.

FIG. 9 diagrammatically illustrates the layout for several different long web factors, that is, double end cuts for truss members. In this set up similarly as illustrated in FIG. 8 the long, low pitch angles 194 will have to be cut as described in connection with FIG. 8 thus eliminating the necessity of changing the saw blade or having to cut the long angles in two steps as necessary in conventional machines.

In summary, the herein described novel cutting apparatus highly facilitates the double end or heel cutting or truss members such as webs, diagonals, chords or the like by combining an adjustable offset saw pivot location with an unique travel mechanism for the saw to provide additional cutting to accommodate a wide arrangement of angle cuts using the same diameter saw blade. This novel arrangement further provided the cutting of a variety of different width truss elements or the simultaneous cutting of a multiple of identical truss elements along the same line of cut.

The present invention may be embodied in other forms without departing from the spirit and essential characteristics thereof, therefore, the present embodiments are to be considered in all respects as illustrative only and not restrictive, the scope of the invention being indicated by the appended claims rather than by the foregoing description.

I claim:

1. An apparatus for cutting or shaping the ends of elongated workpieces, comprising: a longitudinal worktable, one or more cutting stations movably mounted on said worktable, means to support and align said elongated workpieces on said worktable relative to said cutting stations, circular power saws mounted on said cutting stations, said cutting stations mounted for rotation around a vertical axis, and pivot and cam means associated with said circular power saws adapted to provide straight horizontal stroking movement of said circular power saws across said elongated workpieces and at a selected angular position relative to the longitudinal centerline of said elongated workpieces said pivot and cam means associated with each of said circular power saws comprising a rocker arm, a support beam pivoted to the upper end of said rocker arm, cam means supporting the lower end of said rocker arm including slots constructed to cause said rocker arm to rise vertically upon rocking movement of said rocker arm to impart a straight horizontal back and forth movement of said support beam, said circular power saws each being mounted on one end of said support beam, the free end of said support beam extending rearwardly from said rocker arm, and including means associated with said free end of said support beam and cooperating with said cam means to maintain said support beam in a normally straight horizontal position comprising: a stop, limiting the rearward movement of said rocker arm, a tube attached to the lower end of said stop, a rod extending from said tube and carrying a roller on its upper end, said roller bearing upon the upper edge of said support beam for rolling engagement therewith, adjustment means for said roller adapted to exert a force upon the free end of said support beam for initial horizontal adjustment thereof, and a tension spring between said roller end the lower end of said tube to keep said roller in engagement with the upper edge of said support beam, said tension spring having adjustment means independent of said roller adjusting means to adjust the tension of said spring in relation to the position of said roller.

2. The apparatus as defined in claim 1, including means to adjustably vary the position of said vertical axis in relation to the centerline of said elongated workpieces.

3. In the apparatus as defined in claim 2, said last mentioned means comprising selected pivot locations for said vertical axis spaced from a dead center location whose axis normally intersects the centerline of said elongated workpiece.

4. Apparatus for cutting or shaping the ends of elongated workpieces comprising:
 a. a longitudinal worktable;
 b. a pair of oppositely disposed carriages movably mounted on said worktable;
 c. cutting means positioned on said carriages for cutting engagement with said workpieces, said cutting means being rotatable around adjustable vertical axes;
 d. means associated with said cutting means to allow back and forth stroking movement of said cutting means across said workpieces comprising:
  1. vertical support plates rotatable around said adjustable vertical axes;
  2. a rocker arm pivotally mounted between said support plates and extending upwardly therefrom;
  3. a saw support beam pivotally mounted to the upper end of said rocker arm;
  4. a power saw mounted on one end of said saw support beam;
  5. adjustable roller and tensioning means counter balancing the other end of said saw support; and
  6. a dual pivot arrangement between said rocker arm and said support cooperating with said adjustable roller and tensioning means to assure straight horizontal back and forth movement of said saw support upon rocking movement of said rocker arm.

5. In the apparatus defined in claim 4, said carriages comprising semicircular plates provided with protractor scales, an indicator arm rotatable with said cutting means for indicating the angular disposition of said cutting means, a pair of adjustable stop means positioned along the edges of said semicircular plates to stop movement of said indicator arms at selected angular positions.

6. The apparatus defined in claim 5, including magnet means attached to said indicator arms and said adjustable stop means respectively to automatically lock said indicator arms and thus said cutting means in a selected angular position.

7. In the apparatus defined in claim 4, means to lock said movably mounted carriages in a selected position along the length of said worktable.

8. An apparatus for cutting lumber at selected cutting angles comprising a first support composed of top and bottom plates secured to a standard, a tubular pivot member retained between said top and bottom plates for rotation therebetween around a vertical axis, a second plate-type support secured to one side of said pivot member and extending horizontally therefrom, said second plate-type support carrying a rocker arm pivoted thereto at its lower end at two distinct locations vertically remote from each other for rocking movement of said rocker arm, said rocker arm extending upwardly from said second plate-type support for pivotally supporting a support beam at its upper end substantially midway between the ends of said support beam one end of which extending in a normally horizontal direction across the center of said vertical pivot axis, said support beam carrying a circular power saw at the end extending across said vertical pivot axis the free end of said support beam extending rearwardly from said rocker arm in a direction parallel to said second plate-type support, and means secured to said second plate-type support to normally maintain said support beam in a horizontal position relative to said vertical pivot axis and cooperating with said two distinct pivot locations of said rocker arm to maintain said horizontal position of said support beam upon rocking movement of said rocker arm.

9. In the apparatus defined in claim 8, said two distinct pivot locations for said rocker arm comprising first and second cam slots, trunnions attached to said rocker arm extending within said cam slots for camming engagement therein, said first cam slot extending in a straight vertical direction in relation to said support, said second cam slot being positioned vertically above said first cam slot and being formed curvilinear for extension in a substantially horizontal direction to cause said rocker arm to rise in said slots upon rocking movement thereto.

10. In the apparatus defined in claim 8, said means to normally maintain said support beam in a horizontal direction comprising adjustable roller means bearing upon the upper edge of said support beam and individually adjustable spring means for maintaining said roller means in engagement with said support beam.

11. A power saw apparatus for cutting lumber at a desired angle including a mechanism affording accurate horizontal travel of said power saw in a direction substantially normal to the centerline of said lumber, said mechanism comprising a vertical support composed of a pair of plates arranged side by side in spaced relation, a rocker arm extending between said plates and pivoted thereto at two distinct locations for rocking movement of said rocker arm, said rocker arm carrying a support beam supporting a power saw; said two distinct pivot locations comprising a first slot in each of said plates coaxial with each other, said first slots extending in vertical direction and a first pair of trunnions secured to said rocker arm extending within said first slots for camming movement therein; a second slot in each of said plates coaxial with each other and spaced from said first slots, said second slots being curvilinear and extending in a substantially horizontal direction in relation to said first slots, a second pair of trunnions secured to said rocker arm extending within said second slots for camming engagement therewith, said beam supporting said power saw being pivoted to said rocker arm at a point lying on a vertical centerline containing both said first and second pair of trunnions and means adjustably retaining the free end of said beam opposite said power saw to releasably maintain said beam in a normally horizontal position.

12. The apparatus as defined in claim 11, including wearplates between said rocker arm and said support beam and between said rocker arm and said support plates to reduce frictional wear upon rocking movement of said rocker arm.

13. In the apparatus defined in claim 11, said adjustable retaining means including a movable roller bearing upon said support beam and an adjustable spring attached to said roller to maintain said roller in contact with said support beam.

14. An apparatus for cutting a plurality of workpieces at a selected angle relative to the longitudinal center of said workpieces, comprising: a support frame, saw carriages movably mounted on said support frame, said saw carriages including semicircular plates having saw supports mounted thereon for rotation about vertical axes, power saws mounted on said saw supports and rocking means adapted to move said power saws back and forth across said workpieces, first workpiece support means associated with said saw carriages, second workpiece support means mounted on said support frame between said saw carriages including adjustable clamping means for clamping said workpieces to said support frame, workpiece stop means associated with said saw supports for rotatable and longitudinal movement therewith and adapted to align the ends of said plurality of workpieces clamped to said support frame.

15. The apparatus defined in claim 14, including a linear scale inscribed on said support frame for indicating the distance between the engagement of said power saws with said workpieces.

16. The apparatus defined in claim 14, including protractor scales inscribed on said semicircular plates of said saw carriages for indicating the angular position of said power saws in relation to the longitudinal centerline of said workpieces.

17. The apparatus defined in claim 16, including indicator arms mounted on said saw supports for rotation therewith around said semicircular plates between adjustable stop means secured to the rim of said semicircular plates to limit the angular movement of said saw supports in either direction from the longitudinal centerline of said workpieces.

18. The apparatus defined in claim 17, including first magnet means secured to both sides of the outer ends of said indicator arms and second magnet means secured to the inside of said adjustable stop means adapted to automatically lock said indicator arms and said saw supports in any selected angular position relative to the longitudinal centerline of said workpieces.

19. The apparatus defined in claim 14, wherein said vertical axes for said saw supports are adjustable in a horizontal plane around a dead center location to several distinct positions along an arc of 90° both sides from the longitudinal centerline of said workpieces which passes through said dead center location, said saw supports being movable with displacement of said vertical axes to a new location offset to either side of said longitudinal centerline of said workpieces.

20. An apparatus for cutting the end of an elongated workpiece, comprising a longitudinal support frame, a cutting station associated with said support frame, means to support and align said elongated workpiece on said support frame relative to said cutting station, said cutting station having a first support member mounted for rotation about a vertical axis, an upright rocker arm, a second support member carried at the upper portion of said upright rocker arm for pivotal movement about a horizontal axis, saw means carried by said second support member, and pivot and cam means connecting the lower end of said upright rocker arm to said first support member for providing straight horizontal stroking movement of said horizontal axis as said saw means cuts across said elongated workpiece.

21. The apparatus defined in claim 20 wherein said second support member is normally disposed in a horizontal plane and carried by said rocker arm at a point intermediate the ends of said second support member, said saw means being carried at one end of said second support member, the other end of said second support member including means for cooperating with said pivot and cam means for maintaining said second support member in said normally disposed horizontal plane.

22. The apparatus defined in claim 21 wherein said cam means supporting the lower end of said upright rocker arm includes pins, and said first support member includes slots receiving said pins, said pins and slots cooperating to cause said upright rocker arm to impart a straight horizontal back and forth movement of said second support member.

23. The apparatus defined in claim 20 including means to adjustably vary the position of said vertical axis in relation to the centerline of said elongated workpiece.

24. The apparatus as defined in claim 23 wherein said last-mentioned means comprises selected pivot locations for said vertical axis spaced from a dead center location whose axis normally intersects the centerline of said elongated workpiece.